United States Patent
Robins et al.

(10) Patent No.: US 9,327,467 B2
(45) Date of Patent: May 3, 2016

(54) COMPOSITE MANDREL FOR AUTOCLAVE CURING APPLICATIONS

(75) Inventors: Brian G. Robins, Renton, WA (US); Daniel M. Rotter, Lake Forest Park, WA (US); Todd J. Washburn, Maple Valley, WA (US); Panagiotis E. George, Lake Tapps, WA (US)

(73) Assignee: THE BOEING COMPANY, Chicago, IL (US)

( * ) Notice: Subject to any disclaimer, the term of this patent is extended or adjusted under 35 U.S.C. 154(b) by 566 days.

(21) Appl. No.: 12/170,843

(22) Filed: Jul. 10, 2008

(65) Prior Publication Data

US 2010/0006739 A1 Jan. 14, 2010

(51) Int. Cl.
*B29C 70/28* (2006.01)
*B29D 99/00* (2010.01)
*B29C 33/50* (2006.01)
*B29C 70/86* (2006.01)
*B29L 31/30* (2006.01)

(52) U.S. Cl.
CPC .......... *B29D 99/0014* (2013.01); *B29C 33/505* (2013.01); *B29C 70/865* (2013.01); *B29L 2031/3076* (2013.01)

(58) Field of Classification Search
CPC ...... B29C 70/28; B29C 70/342; B29C 70/44; B29C 53/48; B64C 1/064; B32B 9/046
USPC ......... 264/248, 249, 101, 102, 257, 258, 334, 264/510–512, 571; 156/169, 172, 173, 175, 156/185, 189, 285, 286, 297, 382, 323, 242, 156/245, 289; 249/63, 64, 112, 114.1–116, 249/122, 124, 134, 135, 175–177, 183
See application file for complete search history.

(56) References Cited

U.S. PATENT DOCUMENTS

| 2,485,898 | A |   | 10/1949 | Mathews et al. |
| 3,306,767 | A | * | 2/1967  | Snyder ................... 427/162 |
| 3,610,563 | A |   | 10/1971 | Allen |
| 3,700,512 | A | * | 10/1972 | Pearson et al. ............. 156/62.4 |
| 3,764,641 | A |   | 10/1973 | Ash |
| 3,795,559 | A | * | 3/1974  | Horn et al. ................ 156/152 |
| 4,087,502 | A |   | 5/1978  | Hoffmeister |
| 4,662,587 | A |   | 5/1987  | Whitener |
| 4,675,061 | A | * | 6/1987  | Mead ....................... 156/155 |
| 4,681,724 | A |   | 7/1987  | Faiz et al. |

(Continued)

FOREIGN PATENT DOCUMENTS

| JP | H0385680 A | 4/1991 |
| JP | 06071654 A | 3/1994 |

(Continued)

OTHER PUBLICATIONS

International Search Report dated Oct. 2, 2009, regarding Application No. PCT/US2009/048889 (WO 2010/005811), 3 pages.

(Continued)

*Primary Examiner* — Yogendra Gupta
*Assistant Examiner* — Emmanuel S Luk
(74) *Attorney, Agent, or Firm* — Yee & Associates, P.C.

(57) ABSTRACT

A composite mandrel includes a generally elongated mandrel body comprising a resilient mandrel core and an elastomeric mandrel outer layer disposed outside the mandrel core. A method for fabricating a contoured stiffened composite panel is also disclosed.

13 Claims, 4 Drawing Sheets

(56) References Cited

U.S. PATENT DOCUMENTS

| | | | |
|---|---|---|---|
| 4,780,262 A | 10/1988 | VonVolkli | |
| 4,946,526 A * | 8/1990 | Petty-Galis et al. | 156/155 |
| 5,013,514 A | 5/1991 | Azzani et al. | |
| 5,259,901 A | 11/1993 | Davis et al. | |
| 5,354,195 A * | 10/1994 | Dublinski et al. | 425/504 |
| 5,368,807 A * | 11/1994 | Lindsay | 264/510 |
| 5,382,150 A | 1/1995 | Henrio | |
| 5,387,098 A * | 2/1995 | Willden | 425/393 |
| 5,397,524 A * | 3/1995 | Phillips | 264/145 |
| 5,425,628 A | 6/1995 | Pinckney et al. | |
| 5,469,686 A * | 11/1995 | Pykiet | 52/793.11 |
| 5,507,341 A | 4/1996 | Eslinger et al. | |
| 5,538,589 A | 7/1996 | Jensen et al. | |
| 5,605,195 A | 2/1997 | Eslinger et al. | |
| 5,645,668 A | 7/1997 | Lin et al. | |
| 5,707,576 A * | 1/1998 | Asher | 264/258 |
| 5,817,269 A | 10/1998 | Younie et al. | |
| 5,897,818 A * | 4/1999 | Lewit et al. | 264/45.8 |
| 6,458,309 B1 * | 10/2002 | Allen et al. | 264/319 |
| 6,497,190 B1 * | 12/2002 | Lewit | 114/357 |
| 6,510,961 B1 * | 1/2003 | Head et al. | 220/645 |
| 6,613,258 B1 * | 9/2003 | Maison et al. | 264/102 |
| 6,692,681 B1 | 2/2004 | Lunde | |
| 6,743,504 B1 * | 6/2004 | Allen et al. | 428/362 |
| 6,746,642 B2 * | 6/2004 | Buge et al. | 264/510 |
| 6,749,171 B2 * | 6/2004 | Takagi | 249/134 |
| 7,052,572 B2 | 5/2006 | Miura et al. | |
| 7,074,474 B2 * | 7/2006 | Toi et al. | 428/102 |
| 7,083,698 B2 | 8/2006 | Engwall et al. | |
| 7,138,031 B2 | 11/2006 | Erickson et al. | |
| 7,204,951 B2 * | 4/2007 | Simpson et al. | 264/523 |
| 7,293,737 B2 * | 11/2007 | Engwall et al. | 242/590 |
| 7,294,220 B2 | 11/2007 | Anderson | |
| 7,338,703 B2 * | 3/2008 | Merriman | 428/297.4 |
| 7,357,166 B2 | 4/2008 | Pham et al. | |
| 7,419,130 B2 * | 9/2008 | Peery | 249/35 |
| 7,445,744 B2 * | 11/2008 | Simpson et al. | 264/523 |
| 7,459,048 B2 * | 12/2008 | Pham et al. | 156/173 |
| 7,527,222 B2 * | 5/2009 | Biornstad et al. | 244/120 |
| 7,790,082 B2 * | 9/2010 | Buge et al. | 264/258 |
| 7,815,160 B2 * | 10/2010 | Stenard | 249/114.1 |
| 7,824,171 B2 | 11/2010 | Hanson et al. | |
| 7,861,969 B2 * | 1/2011 | Guzman et al. | 244/120 |
| 7,879,276 B2 * | 2/2011 | Guzman et al. | 264/248 |
| 7,897,225 B2 | 3/2011 | Campbell et al. | |
| 7,972,466 B2 * | 7/2011 | Martinez Cerezo et al. | 156/307.1 |
| 7,998,299 B2 * | 8/2011 | McCarville et al. | 156/189 |
| 2002/0178992 A1 * | 12/2002 | Lewit | 114/357 |
| 2004/0070108 A1 * | 4/2004 | Simpson et al. | 264/236 |
| 2005/0051262 A1 * | 3/2005 | Erickson et al. | 156/245 |
| 2005/0161154 A1 * | 7/2005 | Anderson | 156/278 |
| 2005/0230552 A1 * | 10/2005 | Engwall et al. | 244/133 |
| 2007/0044904 A1 * | 3/2007 | Mead et al. | 156/242 |
| 2007/0096368 A1 | 5/2007 | Hanson et al. | |
| 2008/0131716 A1 * | 6/2008 | Ridges | 428/523 |
| 2008/0277531 A1 * | 11/2008 | Ackermann et al. | 244/133 |
| 2008/0290214 A1 * | 11/2008 | Guzman et al. | 244/119 |
| 2008/0302912 A1 * | 12/2008 | Yip et al. | 244/119 |
| 2009/0127393 A1 * | 5/2009 | Guzman et al. | 244/133 |
| 2009/0206504 A1 * | 8/2009 | Campbell et al. | 264/101 |
| 2009/0294040 A1 | 12/2009 | Fernandez et al. | |
| 2010/0009124 A1 | 1/2010 | Robins et al. | |
| 2010/0024964 A1 * | 2/2010 | Ingram et al. | 156/189 |
| 2010/0129589 A1 * | 5/2010 | Senibi et al. | 428/71 |

FOREIGN PATENT DOCUMENTS

| | | |
|---|---|---|
| WO | 9851481 A1 | 11/1998 |
| WO | 2005105402 A1 | 11/2005 |
| WO | 2008003715 A1 | 1/2008 |
| WO | 2008003721 A1 | 1/2008 |
| WO | 2008003733 A1 | 1/2008 |
| WO | 2010005811 A1 | 1/2010 |

OTHER PUBLICATIONS

English Language Machine translation of Japanese Patent Publication No. JP-06071654A, 8 pages.
USPTO PCT Application No. PCT/US2009/048889, filed Jun. 26, 2009, 26 pages.
Webster's New Collegiate Dictionary, G. & C. Merriam Co., Springfield, Massachusettes, 1977, pp. 1279-1280, 4 pages.
USPTO Office Action, dated Jun. 30, 2011, regarding U.S. Appl. No. 12/350,928, 16 pages.
Response to Office Action, dated Sep. 30, 2011, regarding U.S. Appl. No. 12/350,928, 19 pages.
USPTO Final Office Action, dated Dec. 20, 2011, regarding U.S. Appl. No. 12/350,928, 12 pages.
Office Action, dated May 16, 2013, regarding U.S. Appl. No. 12/350,928, 13 pages.
USPTO final office action dated Aug. 7, 2012 regarding U.S. Appl. No. 12/350,928, 28 pages.
Office Action, dated Nov. 3, 2014, regarding U.S. Appl. No. 12/350,928, 17 pages.
Notice of Allowance, dated Sep. 4, 2015, regarding U.S. Appl. No. 12/350,928, 10 pages.

* cited by examiner

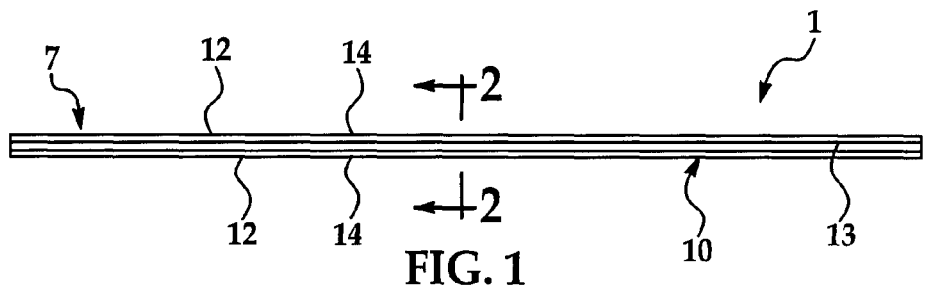
FIG. 1
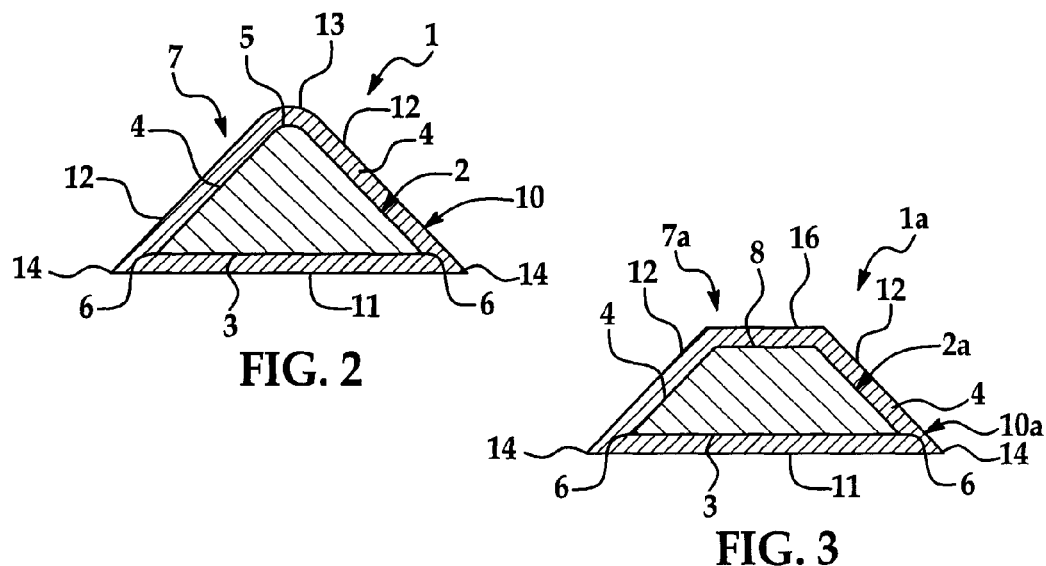
FIG. 2
FIG. 3
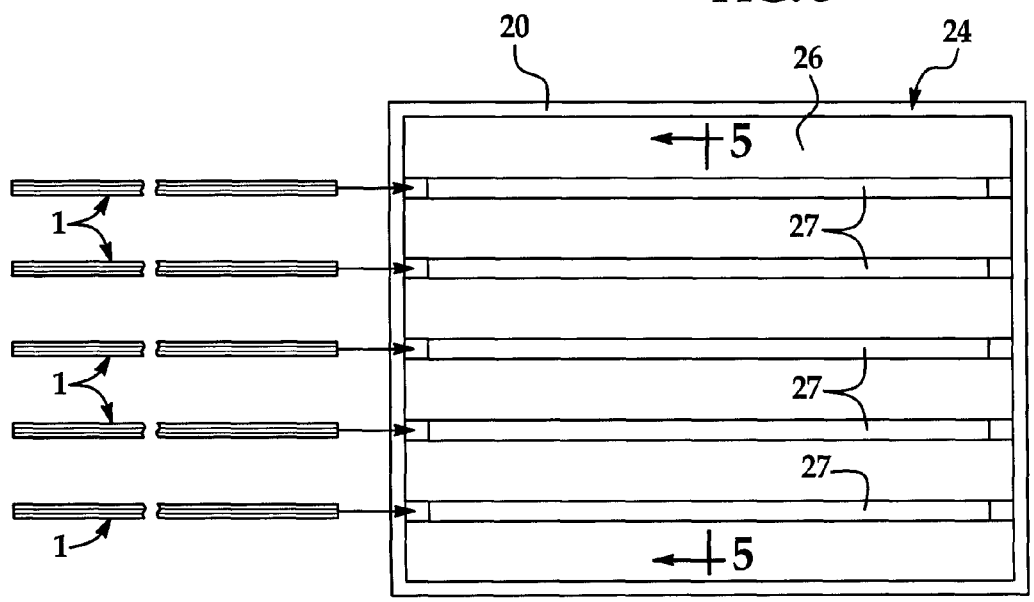
FIG. 4

COMPOSITE MANDREL FOR AUTOCLAVE CURING APPLICATIONS

TECHNICAL FIELD OF THE INVENTION

The disclosure relates to mandrels for forming cavities in composite materials. More particularly, the disclosure relates to a composite mandrel which is suitable for autoclave curing applications in the formation of cavities in composite materials.

BACKGROUND OF THE INVENTION

When composite materials are molded into shapes with cavities, such as hat stringers, for example, there may be a need for some type of tooling that can apply pressure from the cavity outward during the curing step and can be extracted from the cavity after curing. The existing tooling used for this purpose may include without limitation inflatable rubber mandrels; solid mandrels such as metal, rubber or composite mandrels; or dissolvable mandrels. However, the inflatable rubber mandrels may be prone to leaking, which may lead to widespread porosity in the resulting composite laminate. The solid rubber mandrel may result in a cavity with a distorted cross-sectional shape or exert an uneven pressure on the composite laminate and may be too heavy for fabrication of large parts. The solid metal or composite mandrels may not have sufficient flexibility to be removed from parts having any degree of curvature or complexity. The dissolvable mandrels may be expensive to make and difficult to remove from large parts. Existing mandrel designs may not accommodate the dimensional changes of the composite part which occurs during application of heat to the surrounding tooling and part materials at the curing step. This can cause undesirable part material movement resulting in such distortions as waviness, wrinkling and/or bridging in the composite material.

Therefore, a mandrel is needed which is suitable for curing applications in the formation of cavities in composite materials and overcomes some or all of the limitations of conventional composite mandrels.

SUMMARY OF THE INVENTION

The disclosure is generally directed to a composite mandrel. An illustrative embodiment of the composite mandrel includes a generally elongated mandrel body comprising a resilient mandrel core and an elastomeric mandrel outer layer disposed outside the mandrel core. The mandrel may combine the desired characteristics of foam and rubber to produce a manufacturing aid for airplane stringers or other similar open cavity parts made from fiber/resin composite materials. The manufacturing aid which is embodied in the composite mandrel may be less costly, more durable and less prone to failures than current inflatable bladder technologies.

BRIEF DESCRIPTION OF THE ILLUSTRATIONS

FIG. 1 is a top view of an illustrative embodiment of the composite mandrel.

FIG. 2 is a cross-sectional view, taken along section lines 2-2 in FIG. 1, of the composite mandrel.

FIG. 3 is a cross-sectional view of an alternative illustrative embodiment of the composite mandrel.

FIG. 4 is an exploded top view of a composite assembly, more particularly illustrating insertion of multiple composite mandrels into respective stiffening elements in the composite assembly preparatory to curing of the composite assembly.

DETAILED DESCRIPTION

Figure 5:
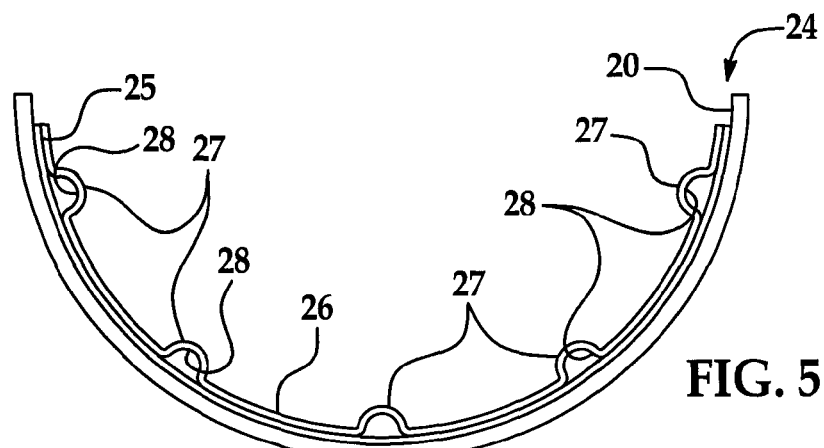
FIG. 5 is a cross-sectional view, taken along section lines 5-5 in FIG. 4, of the composite assembly.

Referring initially to FIGS. 1 and 2, an illustrative embodiment of the composite mandrel is generally indicated by reference numeral 1. The composite mandrel 1 may be used to fill a cavity (not shown) in an airplane stringer or other open-cavity part (not shown) made from fiber/resin composite materials to prevent collapse of the cavity during curing of the composite materials. The composite mandrel 1 may be less costly, more durable and more effective and reliable than current inflatable bladder mandrel technologies.

The composite mandrel 1 includes a generally elongated mandrel body 7 having a mandrel core 2 which is a resilient material and a mandrel outer layer 10 which is disposed outside the mandrel core 2, as shown in FIG. 2, and is an elastomeric material. In some embodiments, the mandrel core 2 is foam or other such material which incorporates open space and/or air pockets to prevent bulk modulus behavior during thermal expansion and the mandrel outer layer 10 may be an elastomeric material such as elastic rubber, for example and without limitation. The mandrel core 2 and the mandrel outer layer 10 may be generally coextensive with the mandrel body 7.

The mandrel core 2 and the mandrel outer layer 10 may have any cross-sectional shape depending on the particular use requirements of the composite mandrel 1. In some applications, for example, each of multiple composite mandrels 1 may be suitably configured to fill respective stiffening elements (such as stringers) 27 during the curing and/or cocuring of a composite panel assembly 24, as shown in FIGS. 4-8 and will be hereinafter described. As shown in FIG. 2, in some embodiments of the composite mandrel 1, the mandrel body 7 may have a generally triangular cross-sectional shape. Accordingly, the mandrel core 2 has a generally flat or planar core base 3 with lateral core edges 6. Core sides 4 angle from the respective core edges 6. A core apex 5, which may be rounded, extends between the core sides 4. The shape of the mandrel outer layer 10 may generally correspond to that of the mandrel core 2, defining a mandrel base 11 which extends adjacent to the core base 3; a pair of mandrel sides 12 which extend adjacent to the respective core sides 4; a mandrel apex 13 which may be rounded and is disposed adjacent to the core apex 5; and mandrel edges 14 which correspond positionally to the respective core edges 6 of the mandrel core 2.

As shown in FIG. 3, in some embodiments of the composite mandrel 1a, the mandrel body 7a may have a generally trapezoidal shape. Accordingly, the mandrel core 2a has a generally flat or planar core base 3; a pair of core sides 4 which angle from the core base 3; and a generally flat or planar mandrel core top 8 which extends between the core sides 4. The mandrel outer layer 10a defines a mandrel base 11 which extends adjacent to the core base 3; a pair of mandrel sides 12 which extend adjacent to the respective core sides 4; a generally flat or planar mandrel top surface 16 which is disposed adjacent to the mandrel core top 8; and mandrel edges 14 which correspond to the respective core edges 6 of the mandrel core 2a.

Referring next to FIGS. 4-8, in typical application, multiple composite mandrels 1 are inserted in respective stiffening elements 27 provided in a stiffening layer 26 of a composite panel assembly 24 during curing of the composite panel assembly 24. The composite panel assembly 24 will ultimately form an airplane stringer (not shown); however, it will be appreciated by those skilled in the art that the composite mandrels 1 can be adapted to fill cavities in any other type of open-cavity or closed-cavity composite material part made from fiber/resin composite materials during curing of the composite material part. The composite mandrels 1 can be adapted to fill cavities having a constant cross-sectional shape or a cross-sectional shape which varies along the length of the composite material, such as cavities which taper or curve along the length of the cavity, for example and without limitation.

As illustrated in FIG. 5, in an embodiment of fabrication of the composite panel assembly 24, a base composite layer 25 may initially be placed on a tooling surface 20 of OML tooling or IML tooling, for example and without limitation. The tooling surface 20 may have a generally concave contour, as shown. Alternatively, the tooling surface 20 may have a generally planar or convex contour, depending on the particular application. The stiffening layer 26 may be placed on the base composite layer 25. The stiffening elements 27 may be shaped in the stiffening layer 26 and extend along the longitudinal axis of the tooling surface 20 in generally parallel relationship with respect to each other, as shown in FIG. 4, and in generally perpendicular relationship with respect to the concave contour of the tooling surface 20. Alternatively, the stiffening elements 27 may be separate or discrete units. As further shown in FIG. 5, each stiffening element 27 has a stiffening element cavity 28. In some embodiments, the stiffening elements 27 may be oriented in orientations other than along the longitudinal axis of the tooling surface 20 and may converge or diverge, for example and without limitation.

Figure 6:
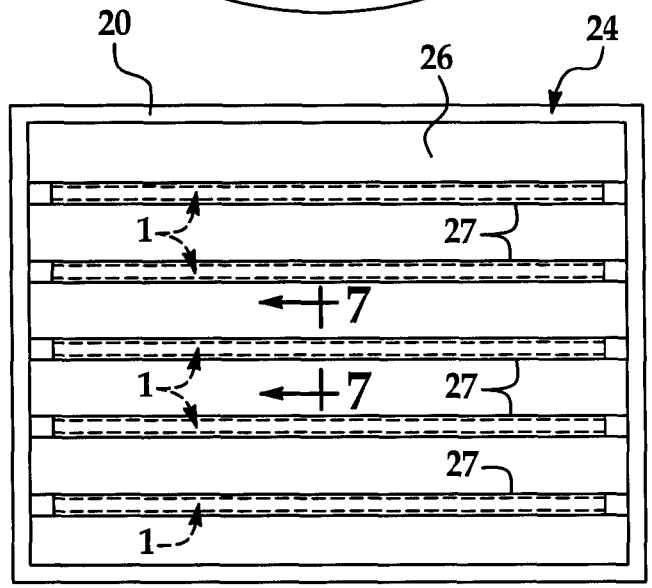
FIG. 6 is a top view of the composite assembly, with the composite mandrels inserted in the respective stiffening elements of the assembly.
Figure 7:
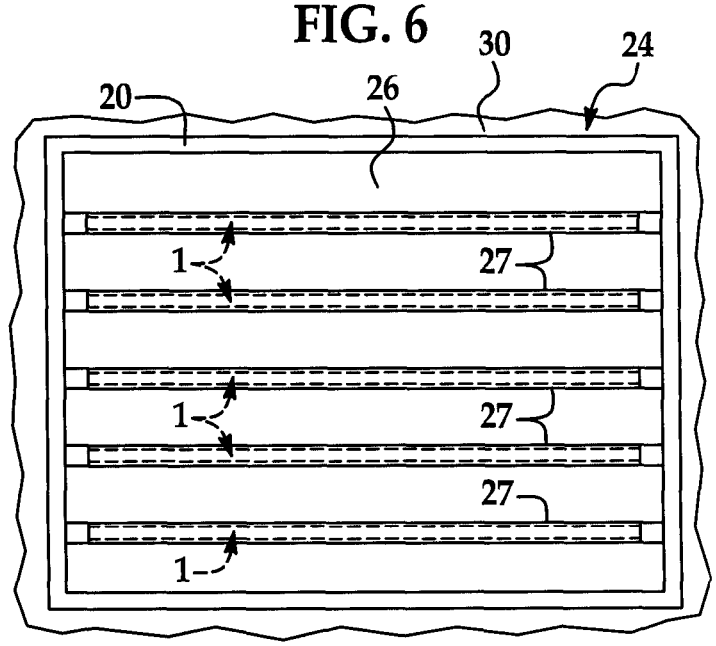
FIG. 7 is a top view of the composite assembly, contained in vacuum bagging preparatory to curing of the assembly.

As shown in FIGS. 4 and 6, multiple composite mandrels 1 may be inserted into the stiffening element cavities 28 of the respective stiffening elements 27. The elastomeric mandrel outer layer 10 of each composite mandrel 1 allows for a proper fit of the composite mandrel 1 into the stiffening element cavity 28 of each stiffening element 27 and conforms to pad-ups and ramps. As shown in FIG. 7, the composite panel assembly 24 may then be enclosed in vacuum bagging 30 and cured by autoclaving. During the curing process, the composite mandrels 1 maintain the shape and prevent collapse of the respective stiffening elements 27 as the composite material of the base composite layer 25 and the stiffening layer 26 hardens.

Figure 8:
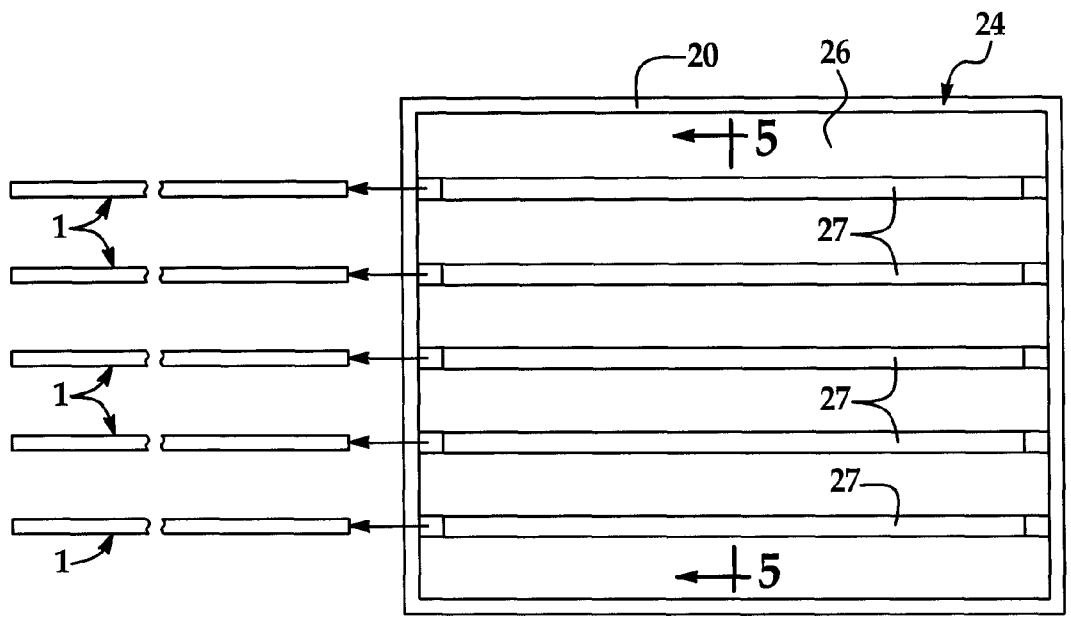
FIG. 8 is an exploded top view of the composite assembly, more particularly illustrating removal of the composite mandrels from the respective stiffening elements in the composite assembly after curing of the composite assembly.

After curing, the composite panel assembly 24 is removed from the vacuum bagging 30. The composite mandrels 1 may be removed from the stiffening element cavitys 28 of the respective stiffening elements 27, as shown in FIG. 8. During removal, the elastomeric mandrel outer layer 10 of each composite mandrel 1 may easily be deformed; this reduces the effort required for removal. The cured composite panel assembly 24 may then be processed to complete fabrication of the airplane assembly (not shown) or other composite part, according to the knowledge of those skilled in the art.

It will be appreciated by those skilled in the art that the resilient mandrel core 2 of the composite mandrel 1 enhances the structural and compressive characteristics of the composite mandrel 1 relative to the designs of conventional mandrels. This structural and compressive support may be necessary to maintain the shape of the stringer or other composite part during automated composite fiber placement as well as autoclave curing. Since the outer mandrel layer 10 may be a constant thickness, it may expand uniformly during curing, thus avoiding the problems associated with uneven expansion of a solid rubber material. The cross-sectional area and type of foam used for the mandrel core 2 may be engineered to impart compression compliance under autoclave pressure, thus offsetting the combined thermal expansion behavior of the foam and rubber.

Figure 9:
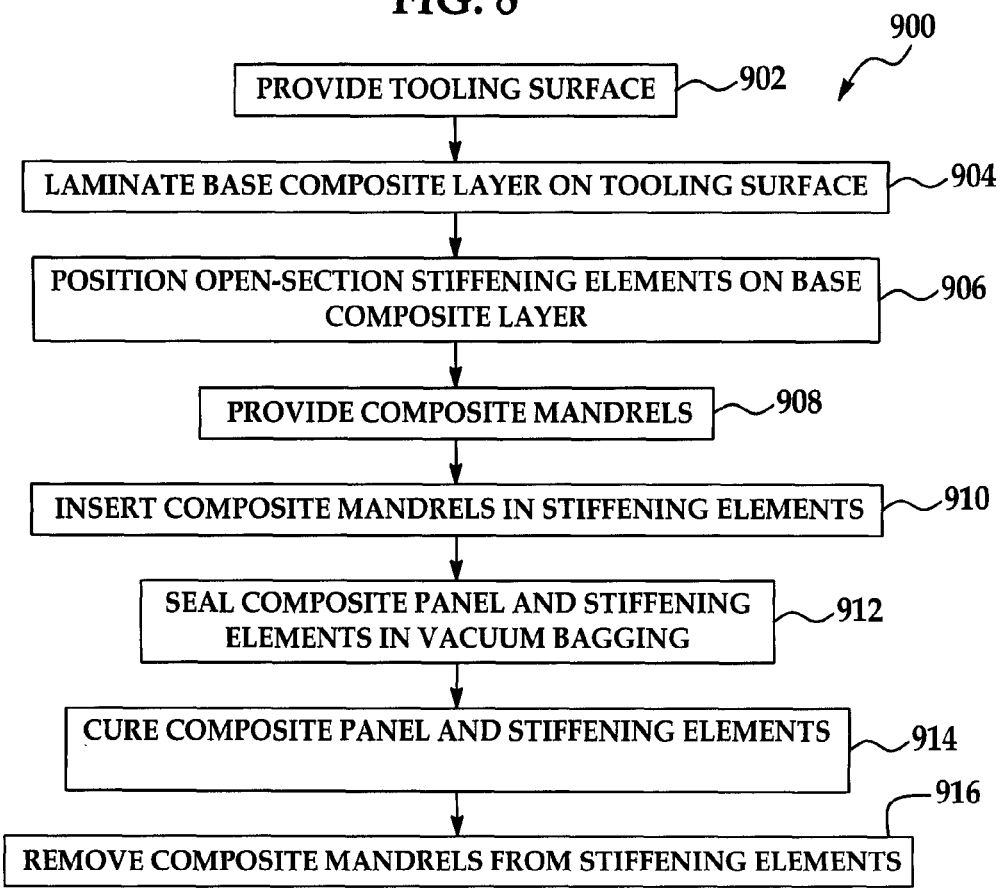
FIG. 9 is a flow diagram which illustrates an illustrative method for fabricating a contoured stiffened composite panel.

Referring next to FIG. 9 of the drawings, a flow diagram 900 which illustrates an illustrative method for fabricating a contoured stiffened composite panel is shown. In block 902, a tooling surface, such as the tooling surface 20 which was heretofore described with respect to FIG. 5, for example and without limitation, is provided. The tooling surface may have a concave, planar, convex or alternative contour. In block 904, a base composite layer is laminated on the tooling surface. In block 906, open-section stiffening elements are positioned on the base composite layer. In block 908, composite mandrels are provided. Each composite mandrel includes a resilient mandrel core and an elastomeric mandrel outer layer disposed outside the resilient mandrel core. In block 910, composite mandrels are inserted in the respective stiffening elements. In block 912, the composite panel and stiffening elements are sealed in vacuum bagging. In block 914, the composite panel and the stiffening elements are cured. An autoclave may be used during curing. In block 916, the composite mandrels are removed from the stiffening elements.

Figure 10:
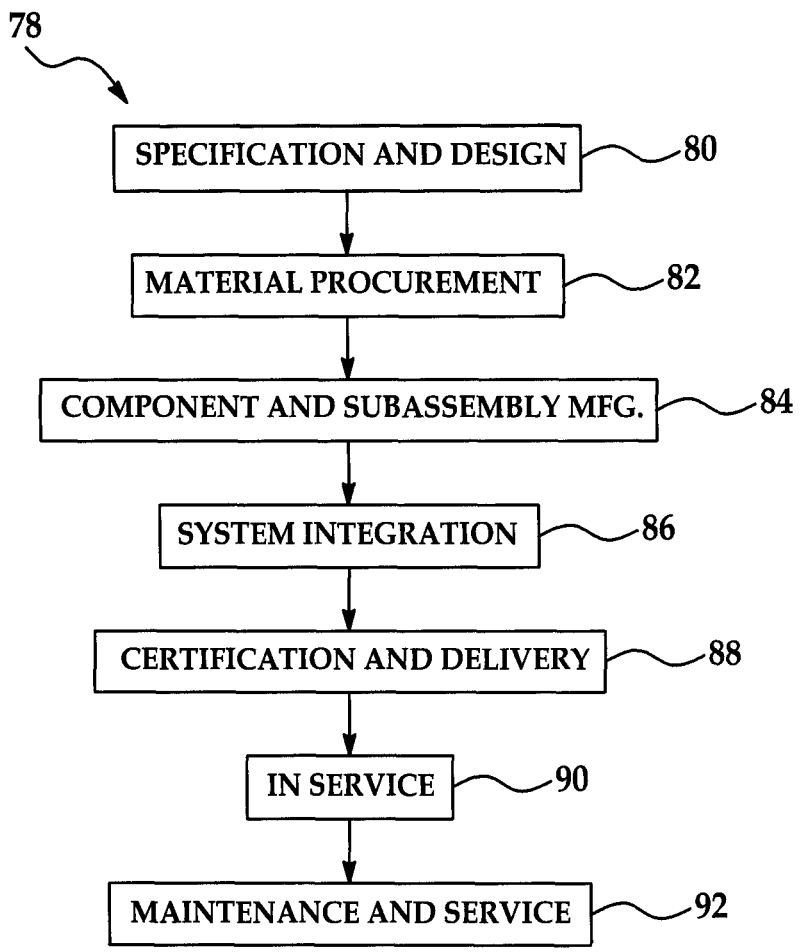
FIG. 10 is a flow diagram of an aircraft production and service methodology.
Figure 11:
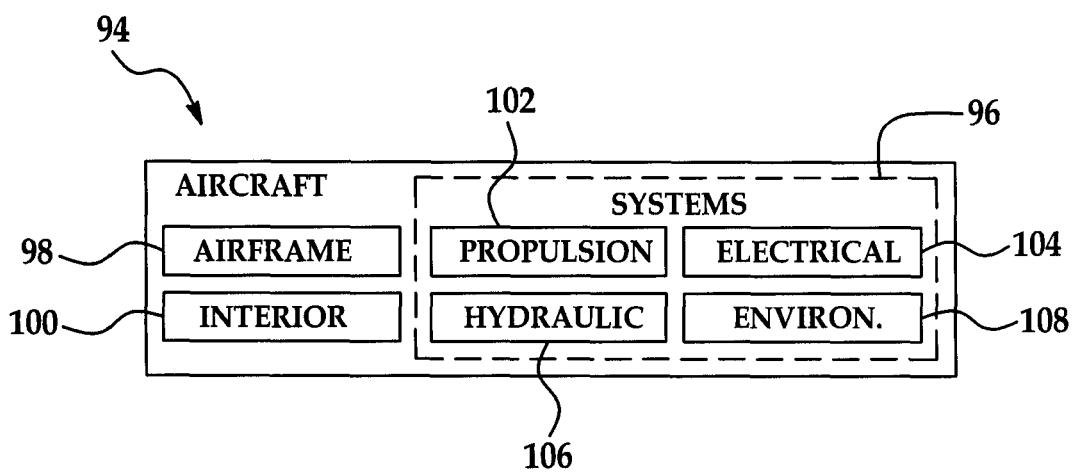
FIG. 11 is a block diagram of an aircraft.

Referring next to FIGS. 10 and 11, embodiments of the disclosure may be used in the context of an aircraft manufacturing and service method 78 as shown in FIG. 10 and an aircraft 94 as shown in FIG. 11. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method for fabricating a contoured stiffened composite panel for an aircraft structure, comprising:
   placing a base composite layer on a tooling surface;
   placing at least one stiffening element having a stiffening element cavity on said base composite layer;
   inserting a one-piece resilient mandrel body in said stiffening element cavity, the one-piece resilient mandrel body comprising a foam core and an elastomeric outer layer substantially co-extensive with the foam core, and wherein the one-piece resilient mandrel body substantially fills the cavity of the stiffening element;
   wherein a cross-sectional area and type of foam used for the foam core is engineered to impart compression compliance under autoclave pressure to offset a combined thermal expansion behavior of the foam core and the elastomeric outer layer, wherein in being engineered, the foam core provides structural and compressive support necessary to maintain a shape of the contoured stiffened composite panel during automated composite fiber placement as well as autoclave curing, and wherein being engineered further comprises the elastomeric outer layer having a substantially constant thickness;
   enclosing said base composite layer and said at least one stiffening element in a vacuum bag and curing the base composite layer and the at least one stiffening element; and
   removing the one-piece resilient mandrel body from said stiffening element cavity of said at least one stiffening element following said curing.

2. The method of claim 1 wherein said tooling surface comprises a generally concave contour.

3. The method of claim 1 wherein the one-piece resilient mandrel body comprises a generally triangular cross-section.

4. The method of claim 1 wherein the one-piece resilient mandrel body comprises a generally trapezoidal cross-section.

5. The method of claim 1 wherein the elastomeric outer layer comprises rubber.

6. The method of claim 1, wherein removing includes deforming the elastomeric mandrel outer layer.

7. A method for fabricating a contoured stiffened composite panel for an aircraft structure, comprising:
   providing a tooling surface having a generally concave contour;
   placing a base composite layer on said tooling surface;
   placing at least one stiffening element having a stiffening element cavity on said base composite layer, the stiffening element comprising at least a stiffening element base surface and a stiffening element side surface;
   providing a composite mandrel, said composite mandrel comprising a generally triangular or trapezoidal cross-section and including a resilient foam mandrel one-piece core coextensive with an elastic rubber mandrel outer layer disposed outside said resilient foam mandrel one-piece core, the composite mandrel comprising a composite mandrel base surface and a composite mandrel side surface, wherein a cross-sectional area and type of foam used for the resilient foam mandrel one-piece core is engineered to impart compression compliance under autoclave pressure to offset a combined thermal expansion behavior of the foam core and the elastomeric outer layer during curing, wherein in being engineered, the foam core provides structural and compressive support necessary to maintain a shape of the contoured stiffened composite panel during automated composite fiber placement as well as autoclave curing, and wherein being engineered further comprises forming the elastic rubber mandrel outer layer to have a substantially constant thickness;
   inserting said composite mandrel in said stiffening element cavity of said at least one stiffening element such that the composite mandrel base surface contacts the stiffening element base surface and the composite mandrel side surface contacts the stiffening element side surface;
   enclosing said base composite layer and said at least one stiffening element in a vacuum bag and curing, during curing the composite mandrel base surface maintaining contact with the stiffening element base surface and the composite mandrel side surface maintaining contact with the stiffening element side surface so as to prevent collapse of the stiffening element; and
   removing said composite mandrel, after curing and without further heating, from said stiffening element cavity of said at least one stiffening element, the removing including deforming the elastic rubber mandrel outer layer so as to reduce an effort of removal.

8. The method of claim 7 wherein the composite mandrel comprises a generally triangular cross-section.

9. The method of claim 7 wherein the composite mandrel comprises a generally trapezoidal cross-section.

10. A method for fabricating a composite panel with a stringer, comprising:
    placing a base composite layer on a tooling surface, the tooling surface having a generally concave contour;
    placing a stiffening element having a cavity on the base composite layer, the stiffening element comprising at least a stiffening element base surface and a stiffening element side surface;
    inserting a composite mandrel in the cavity of the stiffening element, the composite mandrel comprising a core comprising a foam and an outer layer comprising an elastomeric material, the composite mandrel comprising a composite mandrel base surface and a composite mandrel side surface, the composite mandrel substantially filling the cavity of the stiffening element such that the composite mandrel base surface contacts the stiffening element base surface and the composite mandrel side surface contacts the stiffening element side surface, wherein a cross-sectional area and type of foam used for the core is engineered to impart compression compliance under autoclave pressure to offset a combined thermal expansion behavior of the core and the outer layer, wherein in being engineered, the core provides structural and compressive support necessary to maintain a shape of the stringer during automated composite fiber placement as well as autoclave curing, and wherein being engineered further comprises forming the outer layer to have a substantially constant thickness;

enclosing the base composite layer and the stiffening element in a vacuum bag;

curing the base composite layer and the stiffening element so as to form the composite panel with the stringer during curing the composite mandrel substantially filling the cavity of the stiffening element such that the composite mandrel base surface contacts the stiffening element base surface and the composite mandrel side surface contacts the stiffening element side surface; and removing the unitary composite mandrel from the cavity of the stiffening element, the removing including deforming the elastomeric material of the outer layer so as to reduce an effort associated with the removing.

11. The method of claim 10 wherein the outer layer of the composite mandrel comprises an elastic rubber mandrel outer layer.

12. The method of claim 10, wherein the composite mandrel comprises a generally triangular cross-section.

13. The method of claim 10, wherein the composite mandrel comprises a generally trapezoidal cross-section.

* * * * *